March 22, 1932. E. L. MINOR 1,850,940
DEVICE FOR HULLING PEAS, PEELING FRUITS AND VEGETABLES, ETC
Filed Nov. 3, 1928 2 Sheets-Sheet 1
Fig. 1.
Fig. 2.
Fig. 3.
Fig. 4.
Fig. 5.
Fig. 6.
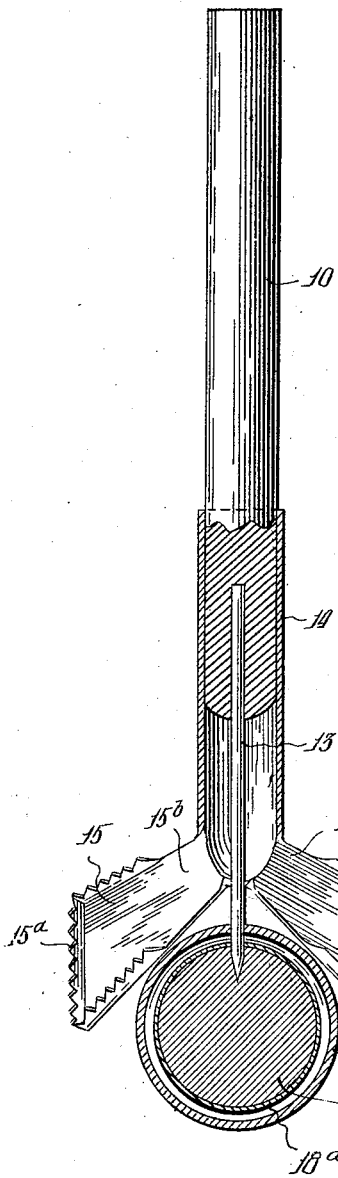
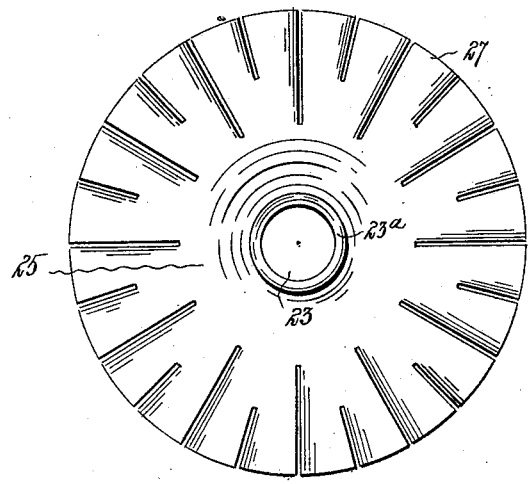
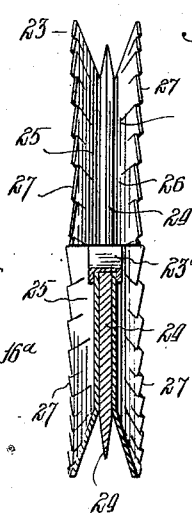
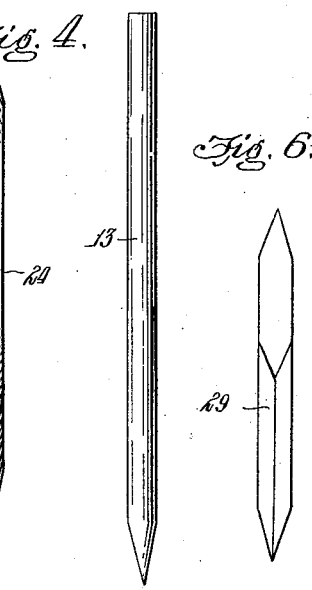
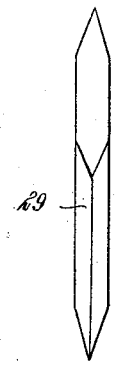
Inventor:-
Edward L. Minor.
By John D. Thomas & Co.
Attorneys

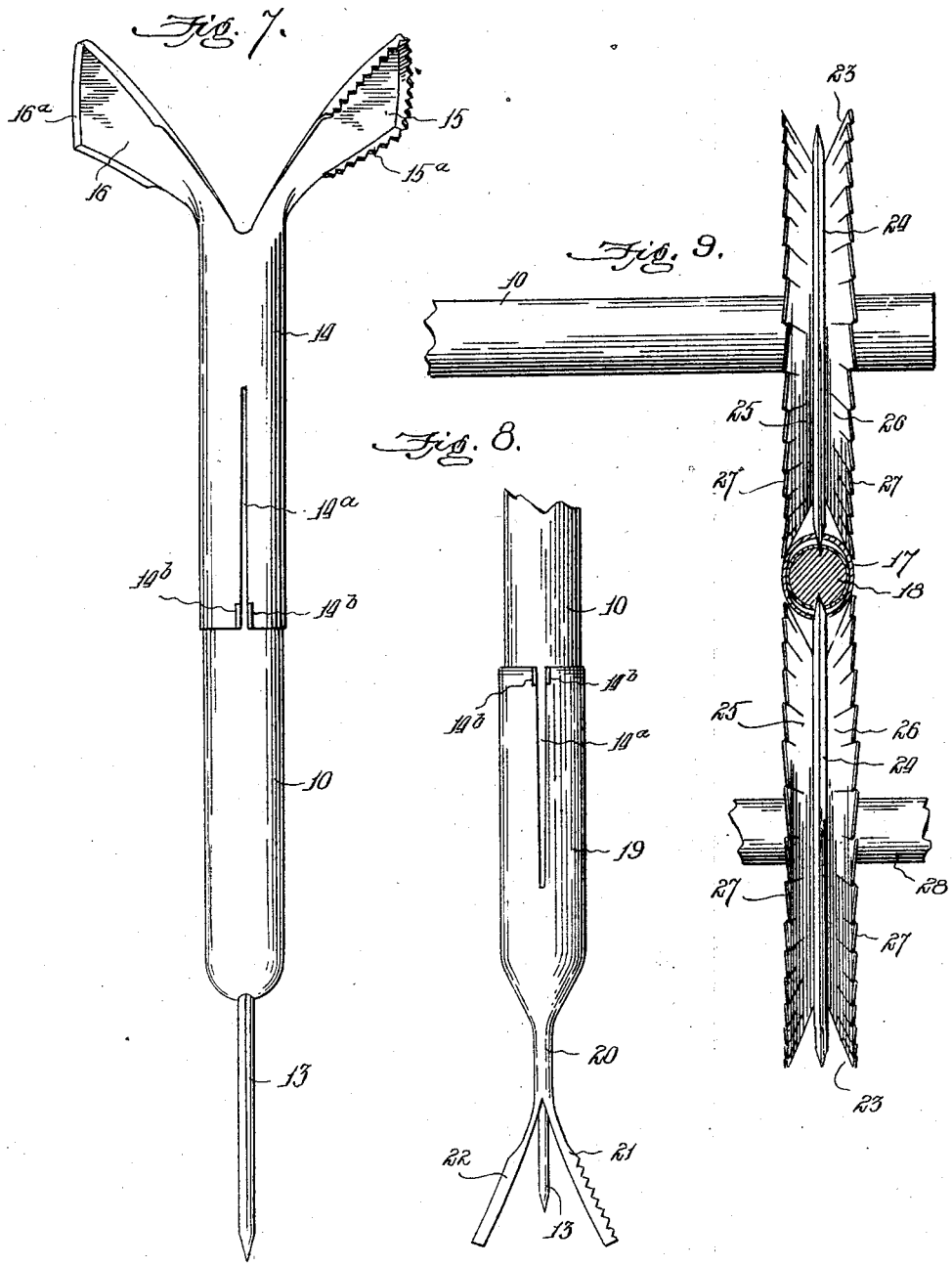
March 22, 1932. E. L. MINOR 1,850,940
DEVICE FOR HULLING PEAS, PEELING FRUITS AND VEGETABLES, ETC
Filed Nov. 3, 1928 2 Sheets-Sheet 2
Inventor:
Edward L. Minor.

Patented Mar. 22, 1932

1,850,940

UNITED STATES PATENT OFFICE

EDWARD L. MINOR, OF O'BRIEN, FLORIDA, ASSIGNOR OF FOUR-TENTHS TO MILTON PLEDGER, OF OSCEOLA COUNTY, FLORIDA

DEVICE FOR HULLING PEAS, PEELING FRUITS AND VEGETABLES, ETC.

Application filed November 3, 1928. Serial No. 316,951.

My invention relates to devices for hulling peas and other leguminous food products, paring or scraping fruits and vegetables, as well as otherwise preparing such articles of food for cooking.

The primary object of my invention is to provide a device for convenience in preparing fruits and vegetables for cooking that will not only facilitate the operation but also prepare leguminous food products, as peas and beans, in a particular manner so that the seed or edible part of the legume will be cooked to be more savory.

In the usual operation of hulling leguminous food products, particularly peas, by hand, the legume is split to expose the seeds usually by breaking the pod or splitting it with the thumb nails, and as the legume contains acid it stains the nails of the hands and the operation is a tedious method of removing the seeds, and therefore it is an important object of my invention to provide a device that will not only facilitate the work of releasing the seeds from the legumes or pods but also puncture or split the seeds so that the seasoning and liquor will penetrate the center for thoroughly cooking the same.

With these principal objects in view, my invention consists in providing a device or devices that can be easily manipulated in preparing fruits and vegetables for cooking, etc., all as hereinafter fully described and specifically claimed.

In the drawings:

Figure 1 is a side elevation showing the preferred form of my invention and its application in hulling pods or separating the seeds from the legumes.

Fig. 2 is a side view of a grooved wheel used in connection with the handle shown in Fig. 1.

Fig. 3 is an edge view thereof, partly in section.

Fig. 4 is an edge view of the cutting blade or disk used in connection with the grooved wheel.

Fig. 5 is a detail view of the rod or pin used in splitting the pod and seeds.

Fig. 6 is a detail view hereinafter referred to.

Fig. 7 is a side elevation showing the arrangement of the device shown in Fig. 1 for use in peeling or scraping fruits and vegetables.

Fig. 8 is a side elevation showing a modification of the device used for peeling or scraping fruits and vegetables, and Fig. 9 is an edge view showing a further modification of my invention.

Like numerals of reference indicate like parts in the several views of the drawings.

In carrying out my invention I provide a handle 10 in the form of a rod, one end of which is preferably rounded as shown in the drawings, and into this end of the rod is secured a pin 13, which is driven or otherwise embedded therein to project therefrom for cooperation with an attachment to the rod or handle which is used in shelling peas and for the purpose of peeling and scraping fruits and vegetables.

The preferred form of the attachment used in connection with the pointed pin for hulling or shelling peas is shown in Figs. 1, 7 and 8, being designed for guiding the legume or pod during the operation of said pin in splitting the pod and puncturing the skin of the peas or seeds so that they will be properly cooked; and so that said holding or guiding attachment may be useful for peeling or scraping fruits and vegetables it consists of a tube 14 adapted to fit over either end of the handle and at its outer end provided with flaring blade-like members 15 and 16 substantially rectangular in shape with the edges outturned abruptly and in one instance formed into saw-teeth 15a and in the other instant providing knife-edges 16a, whereby when the device is used for shelling peas the legume or pod 17 will pass between the plain inner sides of said members while the pin which projects from the handle will slit the pod at the upper edge thereof and also puncture or slit the skin 18a of the seeds 18. The members 15 and 16 are formed at the outer end of the tube by slitting the same at opposite sides thereof and after bending the bifurcated rectangular portions away from each other at an angle the edges thereof are bent outwardly to provide the saw-teeth on one of the members and the knife-edges on the other, it being noted that said saw-teeth and knife-edges are formed at a distance from the inner ends of said blade-like members so that the inner portions 15b and 16b thereof will yield for a desired resiliency of the outer portions when used in peeling or scraping fruits and vegetables. Instead of bending the blade-like members as shown in Figs. 1 and 7 they may be formed as shown in Fig. 8, in which the outer portion of the tube 19 is brought together to provide a flat shank 20 from which the blade-like members 21 and 22 formed by slitting the outer end of the tube project at opposite angles, in this instance also presenting inner flat surfaces between which the pod is passed so as to be slit by the pin 13 projecting from the handle 10 on which the tube is mounted.

I also provide for shelling peas by means of the attachment shown in the drawings and consisting of a wheel 23 having a grooved periphery with a circular knife-edge 24 at the center thereof, said wheel being made up of metal plates 25 and 26 clamped at opposite sides of the knife-edged disk 24 by means of a bushing 23a at the center, the opening through said bushing receiving the outer end of the handle so that the grooved wheel may revolve thereon. As will be noted the outer edges of the metal plates 25 and 26 are bent outwardly from the knife-edged disk so that the inner sides of the outer portions of said plates will engage and guide the pod as the wheel is moved over the same for the action of the disk in splitting the pod, in this present instance the pod engaging surfaces instead of being plain are formed by slitting the plates inwardly from their outer edges and bending the peripheral portions 27 so formed at a slight angle so as to practically overlap each other at their adjoining edges, providing serrations which engage the pod and feed it along for the action of the knife-edged disk.

In Fig. 6 I have shown a device 29 for ripping and cutting, in which one end is beveled to provide a sharp point for various uses in preparing fruits and vegetables, such as removing eyes from potatoes, and as shown in Fig. 4 the disk 24 may be used alone in slitting pods or legumes, and for other purposes.

In the operation of the device as illustrated in Fig. 1 the tube is adjusted on the handle so that the pin will project between the guide members 15 and 16 to the desired extent for splitting the pods passed between said members, and as the latter are of spring metal they will yield to accommodate any unevenness in the pod, it being understood that the tube is adjusted so that the pin will not only split the pod 17 but also puncture or split the skin of the pea or seed 18 so that in cooking the seasoning and juices will enter to make them more savory. It will be obvious therefore that this device not only facilitates the operation of shelling peas and splitting the pods of other legumes but also prepares the edible parts for more efficient cooking of the same. Practically the same results are obtained by using the grooved wheel 23 having the circular cutting disk 24, and in this instance the staggered edges of the opposite rims of the wheel serve to feed the pod as it is cut by the knife-edge. A single wheel mounted on the end of the handle (Fig. 9) can be used in this operation, or two wheels employed as shown, the second wheel being preferably mounted on a suitably supported shaft 28 and the pod or legume passed between said wheels, or both wheels may be mounted on shafts supported in a suitable frame instead of mounting one of them on the handle. In using the members or scrapers 15 and 16 (Figs. 1 and 7) or 21 and 22 (Fig. 8) the member having the saw-teeth is scraped over the skin of the fruit to loosen the same for removal by the member having the knife-edges. It will thus be apparent that my invention provides devices for lessening the labor of preparing fruits and vegetables for cooking, preserving, etc. and that the construction and arrangement herein particularly shown and described may be modified as to details without departing from the spirit and scope of the claims.

I claim:

1. A device for use in preparing fruits and vegetables for cooking, etc., comprising a handle, a tube in slidable engagement with the handle, and members projecting from the outer end of said tube and having their edges bent abruptly to one side to provide scraping edges.

2. A device for use in preparing fruits and vegetables for cooking, etc., comprising a handle, a tube in slidable engagement with the handle, and resilient rectangular shaped members projecting outwardly in opposite directions from the outer end of the tube with the edges at the outer portion of said members turned abruptly to one side to provide scraping edges.

3. A device for use in preparing fruits and vegetables for cooking, etc., comprising a handle, a tube in slidable engagement with the handle and having the outer end portion thereof split at opposite sides to form diverging members, saw-teeth formed at one side of the outer edges of one of the members, and knife-edges formed on the outer edges of the other member with the inner portions of the members plain to provide resiliency of the scrapers.

EDWARD L. MINOR.